(12) United States Patent
Nobori et al.

(10) Patent No.: US 9,258,538 B2
(45) Date of Patent: *Feb. 9, 2016

(54) PROJECTOR AND CONTROL METHOD FOR PROJECTOR

(71) Applicant: Seiko Epson Corporation, Tokyo (JP)

(72) Inventors: Tatsuhiko Nobori, Matsumoto (JP); Toru Katahira, Matsumoto (JP); Katsuhiro Matsuyama, Asahi-mura (JP); Haruyoshi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,236

(22) Filed: Apr. 21, 2015

(65) Prior Publication Data

US 2015/0229895 A1 Aug. 13, 2015

Related U.S. Application Data

(63) Continuation of application No. 13/596,543, filed on Aug. 28, 2012, now Pat. No. 9,039,200.

(30) Foreign Application Priority Data

Aug. 30, 2011 (JP) ................................. 2011-187271

(51) Int. Cl.
*G03B 21/14* (2006.01)
*H04N 9/31* (2006.01)
(Continued)

(52) U.S. Cl.
CPC .............. *H04N 9/3155* (2013.01); *G03B 21/16* (2013.01); *G03B 21/2053* (2013.01); *H04N 9/3194* (2013.01); *H04N 9/3197* (2013.01)

(58) Field of Classification Search
USPC .......... 353/88, 97, 52, 85; 362/264, 373, 276, 362/277, 280, 281
See application file for complete search history.

(56) References Cited

U.S. PATENT DOCUMENTS 6,688,756 B1 2/2004 Akiyama
7,055,966 B2 6/2006 Momose et al.
(Continued)

FOREIGN PATENT DOCUMENTS

CN 1497334 A 5/2004
JP 2000-347293 A 12/2000
(Continued)

OTHER PUBLICATIONS

Non-Final Office Action received in U.S. Appl. No. 13/596,543; Jul. 9, 2014.
(Continued)

*Primary Examiner* — William C Dowling
(74) *Attorney, Agent, or Firm* — ALG Intellectual Property, LLC (57) ABSTRACT

A projector modulates light emitted from a light source and projects the light, the projector including an image acquiring unit, a modulating unit, a light adjusting mechanism, and a light adjusting control unit. The image acquiring unit acquires an image from an image source. The modulating unit modulates the light emitted from the light sources, based on the image acquired by the image acquiring unit. The light adjustment mechanism reduces an amount of light incident on the modulating unit from the light source. The light adjustment control unit performs light adjustment control by the light adjustment mechanism, based on the image acquired by the image acquiring unit. The light adjustment control unit performs control to increase the amount of light incident of the modulating unit when the light adjustment mechanism maintains a predetermined light-adjusted state.

14 Claims, 8 Drawing Sheets

(51) Int. Cl.
*G03B 21/16* (2006.01)
*G03B 21/20* (2006.01)

(56) References Cited

U.S. PATENT DOCUMENTS

| | | |
|---|---|---|
| 7,472,998 B2 | 1/2009 | Sasazaki et al. |
| 7,748,854 B2 | 7/2010 | Sugino et al. |
| 8,398,248 B2 | 3/2013 | Kawamura et al. |
| 2005/0068505 A1 | 3/2005 | Momose et al. |
| 2007/0008501 A1 | 1/2007 | Yamazaki et al. |
| 2007/0018951 A1 | 1/2007 | Nobori et al. |
| 2007/0025683 A1 | 2/2007 | Nobori |
| 2007/0046908 A1 | 3/2007 | Choi |
| 2007/0285574 A1 | 12/2007 | Nobori |
| 2008/0036872 A1 | 2/2008 | Nobori |
| 2009/0265660 A1 | 10/2009 | Nobori |
| 2009/0284544 A1 | 11/2009 | Nobori |
| 2009/0303397 A1 | 12/2009 | Allen et al. |
| 2010/0073640 A1 | 3/2010 | Kimura |
| 2010/0165296 A1 | 7/2010 | Yamada et al. |
| 2010/0214487 A1 | 8/2010 | Nobori |
| 2010/0231871 A1 | 9/2010 | Kitahara |
| 2011/0012915 A1 | 1/2011 | Nobori et al. |
| 2011/0187998 A1 | 8/2011 | Kimura et al. |
| 2012/0019524 A1 | 1/2012 | Nobori |
| 2012/0019568 A1 | 1/2012 | Nobori |
| 2012/0212708 A1 | 8/2012 | Kimura |
| 2012/0314192 A1 | 12/2012 | Kobayashi |
| 2013/0293848 A1 | 11/2013 | Kimura et al. |
| 2014/0204350 A1 | 7/2014 | Kitahara |
| 2014/0333903 A1 | 11/2014 | Kimura |

FOREIGN PATENT DOCUMENTS

| | | |
|---|---|---|
| JP | 2001-021997 A | 1/2001 |
| JP | 2004-362820 A | 12/2004 |
| JP | 2006-337923 A | 12/2006 |
| JP | 2007-41535 A | 2/2007 |
| JP | 2007-47244 A | 2/2007 |
| JP | 2007-58167 A | 3/2007 |
| JP | 2007-121541 A | 5/2007 |
| JP | 2007-212834 A | 8/2007 |
| JP | 2007-241172 A | 9/2007 |
| JP | 2008-15225 A | 1/2008 |
| JP | 2008-122949 A | 5/2008 |
| JP | 2008-145938 A | 6/2008 |
| JP | 2009-25445 A | 2/2009 |
| JP | 2009-276500 A | 11/2009 |
| JP | 2010-55108 A | 3/2010 |
| JP | 2010-078822 A | 4/2010 |
| JP | 2010-160498 A | 7/2010 |
| JP | 2010-204520 A | 9/2010 |
| JP | 2010-210722 A | 9/2010 |
| JP | 2010-211035 A | 9/2010 |
| JP | 2010-211091 A | 9/2010 |
| JP | 2010-217914 A | 9/2010 |
| JP | 2010-244561 A | 10/2010 |
| JP | 2010-256915 A | 11/2010 |
| JP | 2011-133782 A | 7/2011 |
| JP | 2011-158502 A | 8/2011 |
| JP | 2012-28963 A | 2/2012 |
| JP | 2012-28964 A | 2/2012 |
| JP | 2012-28965 A | 2/2012 |

OTHER PUBLICATIONS

Notice of Allowance received in U.S. Appl. No. 13/596,543; Jan. 21, 2015.

| INDEX | VARIABLE ADJUSTMENT ITEMS |
|---|---|
| 0 | VALID/INVALID FLAG FOR THIS CONTROL [TRUE:1 / FALSE:0] |
| 1 | LUMINANCE LEVEL THRESHOLD VALUE OF INPUT SIGNAL [%] |
| 2 | TIME-OUT TIME OF APERTURE CLOSING TIME TIMER [MINUTE] |
| 3 | TIME-OUT TIME OF FORCED OPEN TIME TIMER [MINUTE] |
| 4 | AMOUNT OF CHANGE IN APERTURE OPENING DIRECTION IN NORMAL TIMES [Step/SECOND] |
| 5 | AMOUNT OF CHANGE IN APERTURE CLOSING DIRECTION IN NORMAL TIMES [Step/SECOND] |
| 6 | AMOUNT OF CHANGE IN APERTURE OPENING DIRECTION AT THE TIME OF FORCED OPENING [Step/SECOND] |
| 7 | AMOUNT OF CHANGE IN APERTURE CLOSING DIRECTION AT THE TIME OF RESTORING FORCED OPENING [Step/SECOND] |

FIG. 8

PROJECTOR AND CONTROL METHOD FOR PROJECTOR

CROSS-REFERENCE

The present application is a continuation application of U.S. patent application Ser. No. 13/596,543 filed on Aug. 28, 2012, which claims priority from Japanese Patent Application No. 2011-187271 filed on Aug. 30, 2011, which is hereby incorporated by reference in its entirety.

BACKGROUND

According to a related art, a projector is known in which radiated light from a light source is modulated and projected onto a projection surface and in which the amount of light incident on a light valve for modulating light is changed according to the image to be projected in order to expand the dynamic range and thus project an image of higher image quality (for example, JP-A-2004-362820). In the configuration described in JP-A-2004-362820, a movable light shielding plate is arranged in front of the light source, as a light adjustment device which regulates the amount of light, and shuts of part of radiated light, thus enabling the regulation of the amount of light. However, if the light-adjusted state continues for long, the light shielding plate may become overheated by absorption and scattering of light. As a preventive measure, for example, a cooling device for cooling the light shielding plate is provided in the configuration of JP-A-2004-362820.

However, it is conceivable that the cooling by the cooling device may become insufficient, such as in the case where the light source has a high output or in the case where the light adjustment device and the light source are close to each. Therefore, a high cooling capability needs to be secured. Moreover, there also is a problem that the cooling capability needs to be controlled according to the temperature of the light adjustment device, thus complicating the control.

SUMMARY

An advantage of some aspects of the invention is that a projector in which the overheating of the light adjustment device can be prevented and in which efficient control can be performed and a control method for the projector are provided.

An aspect of the invention is directed to a projector which modulates light emitted from a light source and projects the light, including: an image acquiring unit which acquires an image from an image source; a modulating unit which modulates the light emitted from the light sources, based on the image acquired by the image acquiring unit; a light adjustment mechanism which reduces an amount of light incident on the modulating unit from the light source; and a light adjustment control unit which performs light adjustment control by the light adjustment mechanism, based on the image acquired by the image acquiring unit. The light adjustment control unit stops execution of the light adjustment control when at least one of an operating state of the projector and a state of the image acquired by the image acquiring unit meets a predetermined condition.

According to the above aspect, since the execution of the light adjustment control is stopped when a predetermined condition is met, unnecessary light adjustment control can be omitted, for example, when light adjustment control need not be performed. Overheating of the light adjustment mechanism can be prevented and processing efficiency can be improved.

Another aspect of the invention is directed to the projector described above, wherein the light adjustment control unit stops the execution of the light adjustment control and controls the light adjustment mechanism so as not to reduce the amount of light emitted from the light source, when at least one of the operating state of the projector and the state of the image acquired by the image acquiring unit meets a predetermined condition.

According to this configuration, a state that does not cause a rise in the temperature of the light adjustment mechanism is created when the light adjustment control is stopped. Thus, overheating of the light adjustment mechanism can be prevented securely.

Still another aspect of the invention is directed to the projector described above, wherein the light adjustment control unit performs control to lower a light reduction level by the light adjustment mechanism when the light adjustment mechanism maintains a predetermined light-adjusted state.

Here, the light reduction level refers to the degree to which the amount of light is reduced by the light adjustment mechanism. A higher light reduction level is an indicator for reducing the amount of light by a greater amount. The specific indicator of light reduction level may be any indicator.

According to this configuration, overheating of the light adjustment mechanism can be prevented by lowering the light reduction level.

Yet another aspect of the invention is directed to the projector described above, wherein the image acquiring unit acquires an image inputted from an external device, and the light adjustment control unit stops the execution of the light adjustment control when input of an image from the external device is stopped.

According to this configuration, unnecessary light adjustment control can be stopped, when there is no input of an image and therefore light adjustment need not be carried out.

Still yet another aspect of the invention is directed to the projector described above, which further includes a shutter mechanism which shuts off the light emitted from the light source, and wherein the light adjustment control unit stops the execution of the light adjustment control when the light is shut off by the shutter mechanism.

According to this configuration, unnecessary light adjustment control can be stopped, when the light is shut off by the shutter mechanism and therefore light adjustment need not be carried out.

Further another aspect of the invention is directed to the projector described above, wherein the light adjustment mechanism stops the execution of the light adjustment control when the amount of light is reduced to a predetermined amount of light or less by the modulating unit.

According to this configuration, unnecessary light adjustment control can be stopped, when the light is reduced by the modulating unit and therefore light adjustment by the light adjustment mechanism need not be carried out.

Still further another aspect of the invention is directed to the projector described above, wherein the light adjustment control unit changes a light reduction state by the light adjustment mechanism at least in plural stages in the light adjustment control.

According to this configuration, since the light reduction state changes gradually, light adjustment control can be performed without giving a strange impression to a person who views the image projected by the projector.

Yet further another aspect of the invention is directed to a control method for a projector which includes a light source, a modulating unit that modulates light emitted from the light source, and a light adjustment mechanism that reduces an amount of light incident on the modulating unit from the light source, and which reduces the light emitted from the light source by the light adjustment mechanism and projects the light. The method includes: acquiring an image from an image source; modulating the light emitted from the light source, based on the acquired image; performing light adjustment control by the light adjustment mechanism based on the acquired image; and stopping execution of the light adjustment control when at least one of an operating state of the projector and a state of the acquired image meets a predetermined condition.

According to this aspect, since the execution of the light adjustment control is stopped when a predetermined condition is met, unnecessary light adjustment control can be omitted, for example, when light adjustment control need not be performed. Overheating of the light adjustment mechanism can be prevented and processing efficiency can be improved.

According to the aspects of the invention, overheating of members due to light adjustment can be efficiently prevented.

BRIEF DESCRIPTION OF THE DRAWINGS

The invention will be described with reference to the accompanying drawings, wherein like reference numbers reference like elements.

DESCRIPTION OF EXEMPLARY EMBODIMENTS

Hereinafter, an embodiment of the invention will be described with reference to the drawings.

Figure 1:
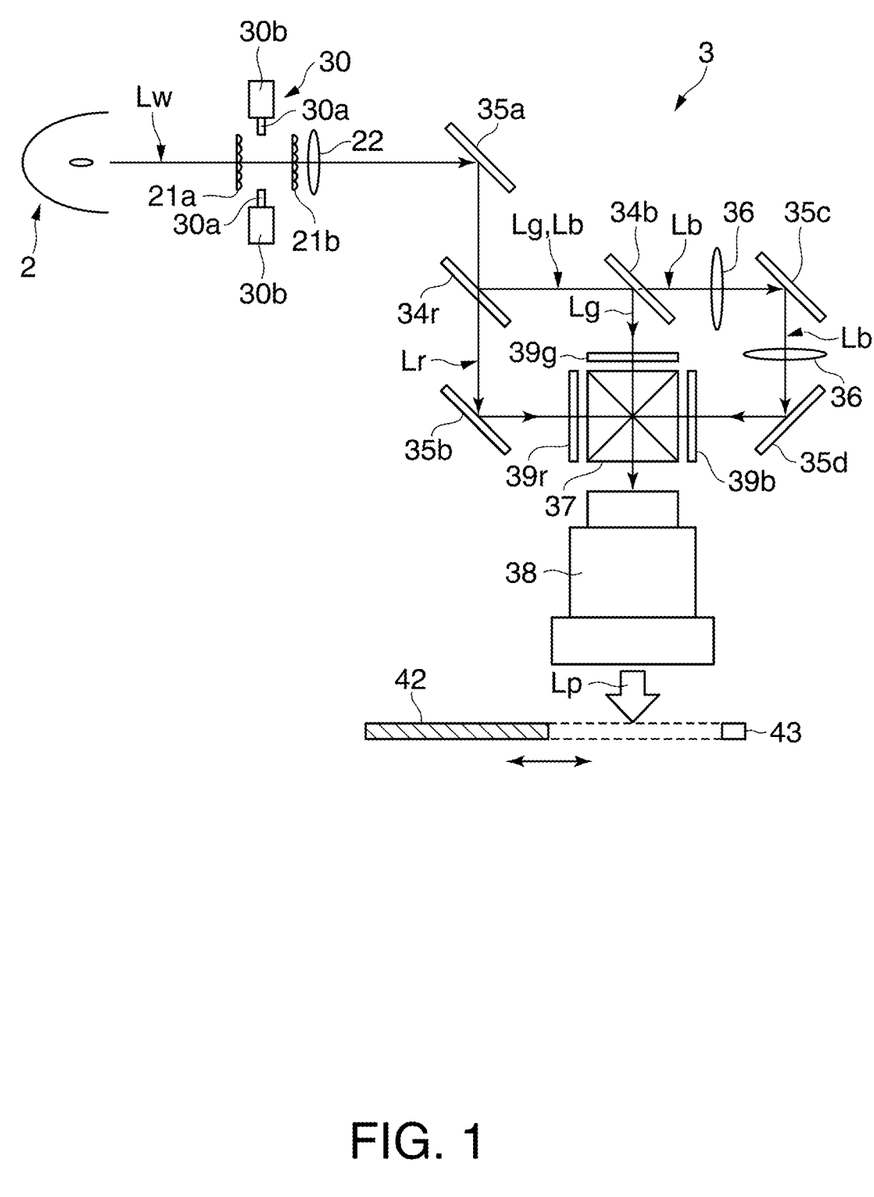
FIG. 1 is a side view and plan view showing an illumination device provided in a projector according to an embodiment.

FIG. 1 is a plan view of essential parts showing the configuration of a projection unit 3 provided in a projector to which the invention is applied.

Figure 2:
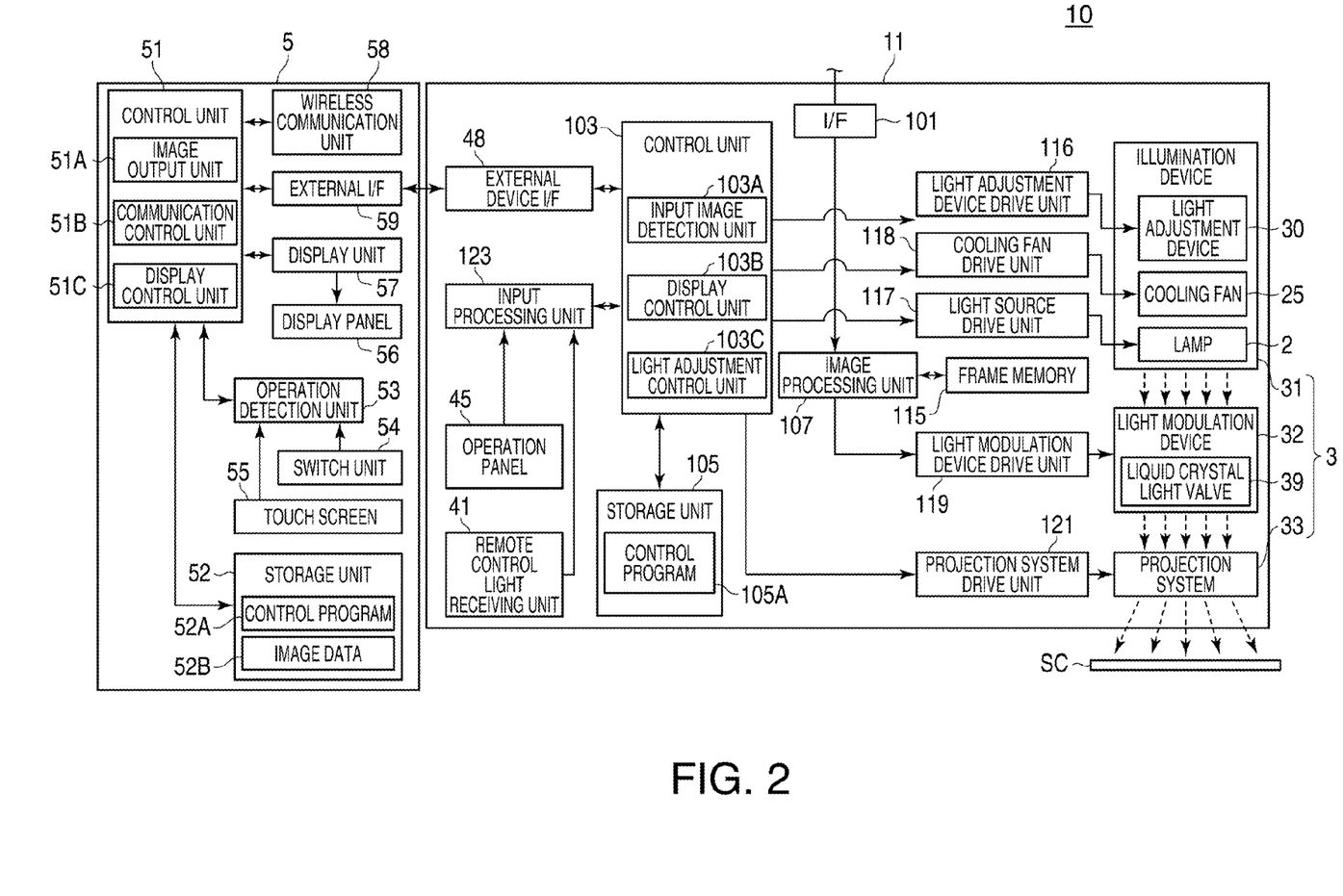
FIG. 2 is a block diagram showing the functional configuration of a projection system including the projector and an image supply device.

As shown in FIG. 1, a projector 11 has a lamp 2 as a light source, and modulates the light emitted from the lamp 2 by a liquid crystal light valve 39 and projects the light to a screen SC (FIG. 2). The lamp 2 is made up of a high-luminance lamp, for example, a metal halide lamp or high-pressure mercury lamp, and emits light Lw including red light Lr, green light Lg and blue light Lb shown in FIG. 1 (hereinafter, the light is referred to as "light L" when each light component is not discriminated).

The projector 11 includes a pair of lens arrays 21a, 21b, a superimposing lens 22, a light adjustment device 30, liquid crystal light valves 39r, 39g, 39b (hereinafter also referred to as "liquid crystal light valve 39" when each light valve is not discriminated), dichroic mirrors 34r, 34b, reflection mirrors 35a to 35d, a relay lens 36, a prism 37 and a projection lens 38. The lens array 21a has the function of a luminous flux dividing optical element which divides a luminous flux from the light source lamp into plural partial lights, and includes plural optical elements (not shown) arrayed in a matrix at a predetermined pitch (array pitch) P within a plane orthogonal to an illumination optical axis. The lens array 21b is an optical element which controls a divergence angle of the plural partial lights formed by the division by the lens array 21a, and includes plural optical elements (not shown) arrayed in a matrix within a plane orthogonal to the illumination optical axis, as in the lens array 21a.

The superimposing lens 22 condenses the plural partial lights passing through the pair of lens arrays 21a, 21b and superimposes the partial lights on an image forming area of the liquid crystal light valve 39.

The projector 11 also has the light adjustment device 30 which adjusts the amount of light incident on the liquid crystal light valve 39, of the light L emitted from the lamp 2 (hereinafter also referred to as "light adjustment"). The light adjustment device 30 (light adjustment mechanism) is a so-called variable aperture device and includes light shielding plates 30a which shut off light and moving parts 30b which move the light shielding plates 30a. In the light adjustment device 30, a light adjustment device drive unit 116 (FIG. 2), described later, causes the moving parts 30b to move the light shielding plates 30a in directions toward each other at each pitch of the optical element, between the two lens arrays 21a, 21b, thus shutting off a part or the whole of the light L. Thus, the amount of the light L incident on the liquid crystal light valve 39 is adjusted (hereinafter also referred to as "light adjustment") and the light radiated from the lamp 2 is reduced to a predetermined amount of light.

In this embodiment, the percentage of remaining light is used as an indicator indicating the degree of light adjustment (light reduction level) by the light adjustment device 30. The percentage of remaining light is 100% in the state where the light shielding plates 30a of the light adjustment device 30 are made to retreat to the maximum from the optical path of the light L and the amount of light incident on the liquid crystal light valve 39 is maximized. When light adjustment is carried out by the light adjustment device 30, the amount of light after light adjustment from the amount of light in the state where the percentage of remaining light is 100% is expressed by a percentage of remaining light. As the percentage of remaining light becomes higher, a greater amount of light is transmitted through the light adjustment device 30. As the percentage of remaining light becomes lower, the amount of transmitted light becomes smaller. The amount of light in the case where the percentage of remaining light is 100% and the amount of light in the case where the percentage of remaining light is 0% are defined by the position of the light shielding plates 30a, the specifications of the moving parts 30b and the like, and there is no limitation on specific amounts of light. For example, there is no problem with the application of the invention even if the amount of light in the case where the percentage of remaining light is 0% is zero.

The liquid crystal light valves 39r, 39g, 39b are driven by a light modulation device drive unit 119, described later, to display an image and then transmit red light Lr, green light Lg and blue light Lb, thus modulating each color light Lr, Lg, Lb based on the displayed image. The dichroic mirrors 34r, 34b, the reflection mirrors 35a to 35d and the relay lens 36 are arranged within the optical path of the light L and cause the light L to become incident on each liquid crystal light valve 39. In this case, the dichroic mirror 34r transmits the red light Lr and reflects the green light Lg and the blue light Lb. The dichroic mirror 34b transmits the blue light Lb and reflects the green light Lg. The reflection mirrors 35a to 35d reflect (totally reflect) the light L. Therefore, on the liquid crystal light valve 39r, only the red light Lr of the light Lw becomes incident. On the liquid crystal light valve 39g, only the green light Lg of the light Lw becomes incident. On the liquid crystal light valve 39b, only the blue light Lb of the light Lw becomes incident. The prism 37 combines the red light Lr, the green light Lg and the blue light Lb modulated by each liquid crystal light valve 39r, 39g, 39b. The projection lens 38 enlarges and projects the light (projection light Lp) combined by the prism 37 onto the screen SC.

In front of the projection lens 38, a lens shutter 42 (shutter mechanism) which shuts off the light emitted from the projection lens 38 is arranged. The lens shutter 42 is arranged in a manually slidable manner in the directions of arrows shown in FIG. 1. Usually, the lens shutter 42 is completely opened when the projector 11 projects light, and the lens shutter 42 is closed after the projection ends. The projector 11 has a shutter detection unit 43 which detects that the lens shutter 42 is closed. If the closure of the lens shutter 42 is detected during the projection, the projector 11 performs control to switch off the lamp 2 or reduce the light.

FIG. 2 is a block diagram showing the functional configuration of a projection system 10 including an image supply device 5 and the projector.

The projector 11 is connected to an external image supply device (not shown) such as a personal computer or various image players via an I/F (interface) 101 and projects an input image inputted from these image supply devices onto the screen SC. The I/F 101 may include, for example, a USB interface, a wired or wireless LAN interface, VGA terminal to which an analog video signal is inputted, DVI (digital visual interface) to which a digital video signal is inputted, S video terminal to which a composite video signal such as NTSC, PAL or SECAM is inputted, RCA terminal to which a composite video signal is inputted, D terminal to which a component video signal is inputted, HDMI connector conforming to HDMI (trademark registered) standards, and the like. The I/F 101 may also include an interface circuit for inputting and outputting a signal via the above terminals and connector. The image supply device may be an image output device such as a video playback device, DVD playback device, television tuner device, set-top box of CATV or video game device, or may be a PC (personal computer) or the like.

The projector 11 can display both still images and dynamic images (video). The screen SC is, for example, a rectangular screen installed in an upright position. In addition to the screen for the projector, a wall surface may be used as the screen SC.

The projector 11 also includes an external device I/F 48 connected to the image supply device 5 as an external device. The external device I/F 48 is provided as a dedicated interface for the image supply device 5 and has a dedicated connector that is adapted to an external I/F 59 provided in the image supply device 5. As image data is inputted to the external device I/F 48 from the image supply device 5, a control unit 103 acquires the inputted image data by the functions of an input image detection unit 103A and a display control unit 103B, described later, then causes an image processing unit 107 to perform image processing of the image data inputted from the I/F 101, and causes the projection unit 3 to project an image based on the image data onto the screen SC.

The image supply device 5 is configured, for example, as a portable media player and has a function of supplying an internally stored image or an image acquired by the image supply device 5 from an external device, to the projector 11. As a specific example, the image supply device 5 may have a mobile phone function as well as an audio-video player.

The image supply device 5 has a control unit 51 including a CPU which executes a predetermined program and controls each part of the image supply device 5, a ROM in which a basic control program executed by the CPU and data related to the basic control program and the like are stored in a non-volatile way, and a RAM or the like in which programs executed by the CPU and data are temporarily stored. The image supply device 5 also has a storage unit 52 which stores an application program or the like executed by the control unit 51, and a display unit 57 which displays various screens on a display panel 56 under the control of the control unit 51. The image supply device 5 also has an operation detection unit 53 which is connected to a switch unit 54 including various operation members provided on the body of the image supply device 5 and to a touch screen 55 superimposed on the surface of the display panel 56 and detecting a touch operation, and which detects an input operation on the switch unit 54 and the touch screen 55. The image supply device 5 also has a wireless communication unit 58 which transmits and receives various data to and from an external device such as another personal computer or the projector 11 via a wireless communication network under the control of the control unit 51, and an external I/F 59 which outputs digital image data to the projector 11. These units are interconnected via a bus.

The image supply device 5 starts operating according to an operation detected by the operation detection unit 53, then executes an application program designated by this operation, and for example, plays back and displays image data 52B stored in the storage unit 52, by an image viewer program function. Here, the image supply device 5 displays an image of the image data 52B, which is a dynamic image or still image, on the display panel 56 by the function of the display unit 57 and also transmits the image data for displaying the same screen as the screen displayed on the display panel 56 to the projector 11.

The image supply device 5 can also transmit image data and control information to the projector 11 by the wireless communication unit 58. However, in this embodiment, an example where image data is outputted from the external I/F 59 is described.

The storage unit 52 stores a control program 52A executed by the control unit 51 and various data such as the image data 52B processed by the image supply device 5, in a form that is readable by the CPU of the control unit 51. Moreover, in the case where the image supply device 5 has an image pickup function for still image or dynamic image, the storage unit 52 may store picked-up image data that is picked up.

The image supply device 5 executes the control program 52A stored in the storage unit 52 and thus functions as an image output unit 51A which outputs an image to the projector 11, a communication control unit 51B which controls communication with an external device, and a display control unit 51C which controls display on the display panel 56.

The image output unit 51A detects that the image supply device 5 is connected to the projector 11 via the external I/F 59, and then outputs the image data 52B selected by the operation of the operation detection unit 53, or generates data for displaying image data acquired from an external device by the communication control unit 51B and outputs the generated data to the projector 11 via the external I/F 59. Here, the image output unit 51A can execute processing to adjust or convert the resolution, frame rate, color tone, data format and the like of the image data 52B or the image data acquired from the external device, in the way that suits the projector 11. Also, as it is detected that the external I/F 59 is removed from the projector 11, the image output unit 51A stops outputting data from the external I/F 59.

The projector 11 is roughly made up of the projection unit 3 (image display unit) which performs optical image formation, and an image processing system which electrically processes a display signal inputted to the projection unit 3. The projection unit 3 includes an illumination device 31, a light modulation device 32 as a modulating unit, and a projection system 33.

The illumination device 31 has the lamp 2 as a light source. As the light source provided in the illumination device 31, an LED (light emitting diode) or the like can also be used as well as the lamp 2. The illumination device 31 also includes the pair of lens arrays 21a, 21b, the superimposing lens 22 and the light adjustment device 30, in addition to the lamp 2. The illumination device 31 also has a cooling fan 25 which blasts the outside air against the lamp 2 and the light adjustment device 30 and thus cools the lamp 2 and the light adjustment device 30. The cooling fan 25 may be installed near the lamp 2 and the light adjustment device 30. Alternatively, if a blast path for sending the air to the lamp 2 and the light adjustment device 30 is formed, the cooling fan 25 may be provided at a position connected to this blast path. Also, the cooling fan 25 may be arranged in such a way as to send the air also a power-supply circuit unit (not shown) which supplies power to each unit including the lamp 2.

The light adjustment device 30 is connected to the light adjustment device drive unit 116. As the light adjustment device drive unit 116 drives the moving parts 30b (FIG. 1), the light shielding plates 30a (FIG. 1) are made to advance to and retreat from the optical path of the light L. A cooling fan drive unit 118 which supplies a drive current to the cooling fan 25 is connected to the cooling fan 25. The cooling fan 25 rotates at the number of rotations corresponding to this drive current. The cooling fan drive unit 118 controls the drive current supplied to the cooling fan 25 and thus can switch the number of rotations of the cooling fan 25 at least in two stages or more. Also, a light source drive unit 117 which controls lighting of the lamp 2 is connected to the lamp 2. The light source drive unit 117 switches on and off the lamp 2 under the control of the control unit 103.

The light modulation device 32 has a configuration for modulating the light emitted from the light adjustment device 30. The light modulation device 32 has the liquid crystal light valve 39 including three liquid crystal panels corresponding to the primary colors RGB, as shown in FIG. 1, and the modulated light modulated by the liquid crystal light valve 39 is radiated to the projection system 33. The configuration by which the light modulation device 32 modulates light is not limited to the configuration with the liquid crystal light valve 39 using three transmission-type liquid crystal panels. For example, three reflection-type liquid crystal panels can be used, or a system using a combination of a liquid crystal panel and a color wheel, a system using three digital mirror devices (DMDs), a system using a combination of a digital mirror device and a color wheel, or the like can be used. In the case where the light modulation device 32 uses only one liquid crystal panel or DMD, members equivalent to the combining system including the dichroic mirrors 34r, 34b and the prism 37 shown in FIG. 1 are not necessary. Also, other than the liquid crystal panel and DMD, any configuration that can modulate light emitted from the light source can be employed without problems.

The projection system 33 has the projection lens 38 (FIG. 1) which enlarges and reduces an image to be projected and adjusts the focus, and a zoom adjustment motor (not shown) which drives the projection lens to adjust the degree of zooming and a focus adjustment motor (not shown) which drives the projection lens to adjust the focus, and the like. The projection system 33 projects the incident light modulated by the light modulation device 32 onto the screen SC (display surface) using the projection lens 38 and thus forms an image thereon. A projection system drive unit 121 which drives each motor provided in the projection system 33 under the control of the control unit 103 is connected to the projection system 33.

The image processing system is configured with the control unit 103 which controls the entire projector 11 comprehensively, as a central unit. The image processing system includes a storage unit 105 in which data to be processed by the control unit 103 and a control program 105A to be executed by the control unit 103 are stored, an input processing unit 123 which detects an operation via an operation panel 45 and a remote control light receiving unit 41, the image processing unit 107 which processes image data inputted to the I/F 101, and the light modulation device drive unit 119 which drives the liquid crystal light valve 39 of the light modulation device 32 based on a display signal outputted from the image processing unit 107.

The control unit 103 reads out and executes the control program 105A stored in the storage unit 105 and thus controls each part of the projector 11. The control unit 103 detects the content of an operation carried out by the user, based on an operation signal inputted from the input processing unit 123, and according to this operation, controls the image processing unit 107, the light adjustment device drive unit 116, the light source drive unit 117, the cooling fan drive unit 118, the light modulation device drive unit 119, the projection system drive unit 121 and the light source drive unit 117, thus causing an image to be projected on the screen SC.

On the body of the projector 11, the operation panel 45 having various switches and an indicator lamp for the user to carry out operations is arranged. The operation panel 45 is connected to the input processing unit 123. The input processing unit 123 properly switches on and off the indicator lamp on the operation panel 45 according to the operating state and setting state of the projector 11, under the control of the control unit 103. As a switch on the operation panel 45 is operated, an operation signal corresponding to the operated switch is outputted to the control unit 103 from the input processing unit 123.

The projector 11 also has a remote controller (not shown) to be used by the user. The remote controller has various buttons and transmits an infrared signal corresponding to the operation of these buttons. On the body of the projector 11, the remote control light receiving unit 41 which receives the infrared signal sent from the remote controller is arranged. The remote control light receiving unit 41 decodes the infrared signal received from the remote controller, then generates an operation signal indicating the content of the operation on the remote controller, and outputs the operation signal to the control unit 103.

The control unit 103 includes an input image detection unit 103A which detects the state of an image inputted via the I/F 101 or the external device I/F 48, a display control unit 103B (image acquiring unit) which acquires image data inputted from the I/F 101 or the external device I/F 48 and controls the image processing unit 107, the light source drive unit 117, the light modulation device drive unit 119 and the projection system drive unit 121 to project an image based on the acquired image data, and a light adjustment control unit 103C (light adjustment control unit) which control the light adjustment state by the light adjustment device drive unit 116.

The light adjustment control unit 103C controls the light-adjusted state by the light adjustment device 30 based on the content of the image data acquired by the display control unit 103B, then calculates luminance distribution for each frame of the image data, and based on the luminance distribution, adjusts the amount of the light L so that the frame can be projected utilizing the gradation range of the liquid crystal light valve 39 to the maximum. For example, for a frame with a high luminance as a whole, a low light reduction level is set and the amount of the light L is increased by the light adjustment device 30. Thus, the frame can be displayed with accurate gradation so that blotting out of dark parts in the frame can be prevented. For a frame with a low luminance, the light reduction level is increased and the amount of the light L is reduced. Thus, displaying with accurate gradation is realized utilizing the gradation range of the liquid crystal light valve 39 to the maximum. Such control to adjust the amount of light by the light adjustment device 30 in order to acquire a projected image with high definition is called variable aperture control (light adjustment control).

The image processing unit 107 generates a display signal based on the image data inputted via the I/F 101 or the external I/F 48 and outputs the display signal to the light modulation device drive unit 119, under the control of the control unit 103. The light modulation device drive unit 119 drives the light modulation device 32 based on the display signal inputted from the image processing unit 107. Thus, the digital image data inputted from the image supply device 5 is processed by the image processing unit 107, and the light L is modulated to image light by the light modulation device 32 that is driven based on the processed image data. The image light is projected as a projected image on the screen SC via the projection system 33.

The control unit 103 also has an AV mute function of stopping the projection of an image on the screen SC when the operation of an AV mute key (not shown) provided on the remote controller (not shown) is detected by the remote control light receiving unit 41, and when the operation of an AV mute key (not shown) provided on the operation panel 45 is detected. When executing this AV mute function, the control unit 103 controls the image processing unit 107 to control the display signal outputted to the light modulation device drive unit 119 so that a solid black image is projected. Therefore, the light emitted from the light adjustment device 30 is mostly shut off by the liquid crystal light valve 39 and nothing appears on the screen SC. As a canceling operation is carried out, for example, the AV mute key is pressed again, the control unit 103 stops the AV mute function and restores the normal image projection state.

The control unit 103 also executes the AV mute function when the shutter detection unit 43 detects that the lens shutter 42 is closed, as in the case where the AV mute key is operated. In such a case, the control unit 103 starts the AV mute function as the shutter detection unit 43 detects the closure of the lens shutter 42. When it is detected that the lens shutter 42 is opened based on a change in the detection state of the shutter detection unit 43, the control unit 103 stops the AV mute function and restores the normal image projection state.

In the projector 11 configured in this manner, in the state where variable aperture control is executed and the light reduction level of the light adjustment device 30 is raised, that is, in the state where the light shielding plates 30a are protruding largely to the optical path of the light L, the light shielding plates 30a receives much of the light energy of the lamp 2 and tends to have higher temperatures. If such a state continues for a long time, overheating of the light adjustment device 30 may be occur. Thus, by the function of the light adjustment control unit 103C, the projector 11 performs forced open control in which the light adjustment device 30 is forced to be in an open state based on a predetermined condition so that the light adjustment device 30 is not overheated during the execution of the variable aperture control.

In the forced open control, the light adjustment control unit 103C causes the light shielding plates 30a (FIG. 1) advancing to the optical path of the light L by the variable aperture control to retreat from the optical path irrespective of the luminance distribution of image data or the like, and thus avoids a temperature rise in the light adjustment device 30. During the execution of the forced open control, control to lower the light reduction level gradually from the light reduction level that is set based on the image data as described above is carried out. Specifically, the light shielding plates 30a are controlled to retreat gradually from the optical path of the light L, at least through plural stages. The light shielding plates 30a ultimately retreat completely from the optical path and the percentage of remaining light becomes 100% (the state where the light shielding plates 30a retreat completely from the optical path of the light L). Here, as the light shielding plates 30a retreat gradually, the luminance of the projected image on the screen SC changes gradually. Therefore, there is an advantage that the forced open control can be carried out without giving a strange impression to the person viewing the image. Also, when the forced open control is executed, the image processing unit 107 and the light modulation device drive unit 119 may be controlled in accordance with changes in the light reduction level of the light adjustment device 30 and the gradation of an image expressed by an image signal outputted to the liquid crystal light valve 39 may thus be corrected. In this case, the gradation of the image expressed by the image signal outputted to the liquid crystal light valve 39 can be shifted to the darker side in accordance with the improvement in the percentage of remaining light at the light adjustment device 30, and the overall luminance of the image that is ultimately projected on the screen SC can be kept almost unchanged. In this case, though detailed gradation expressions in the projected image may be lowered in definition, the brightness of the projected image as a whole does not change significantly and the light adjustment device 30 can be prevented from being overheated while the projection of the image is continued.

Figure 3:
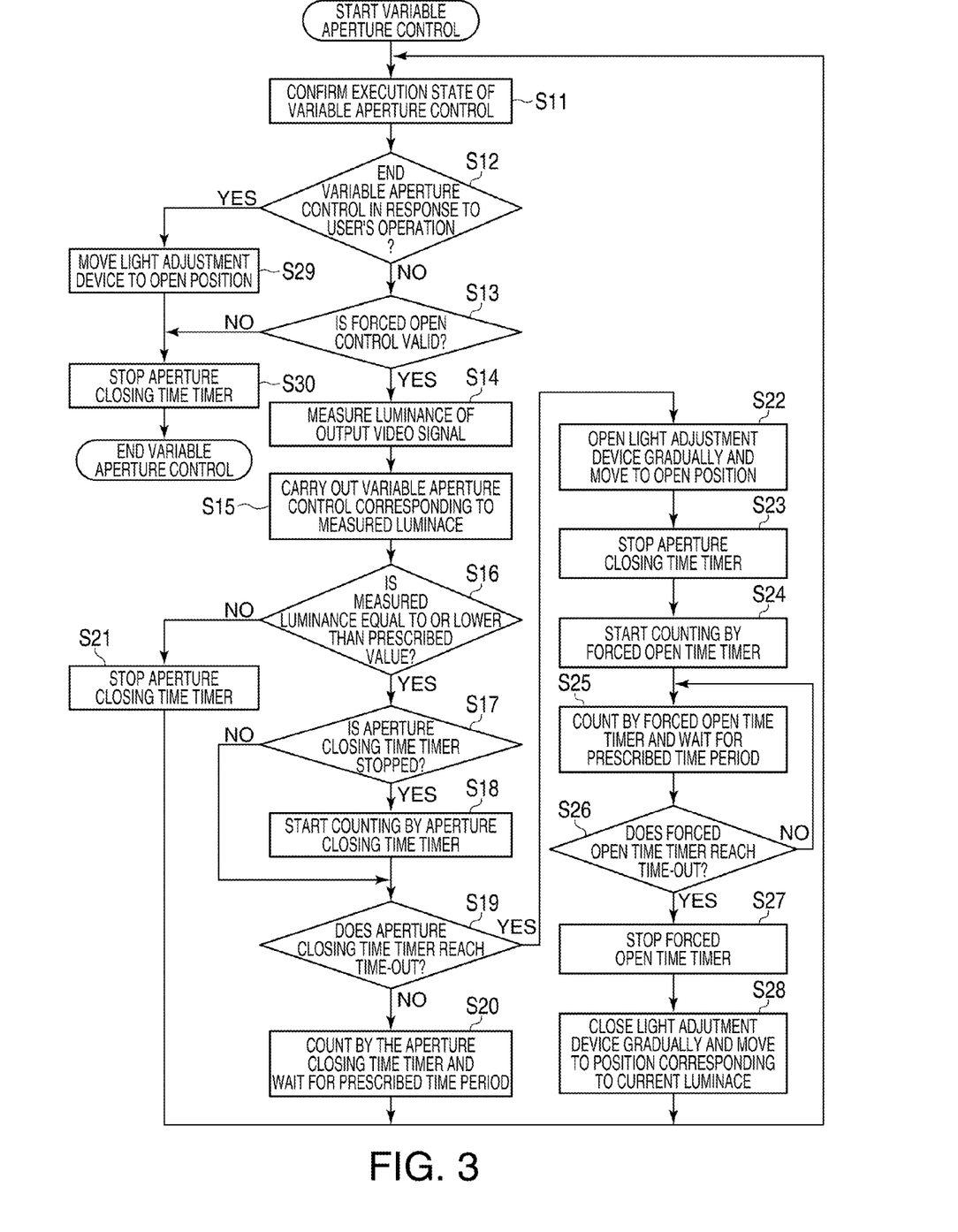
FIG. 3 is a flowchart showing operations of the projector.
Figure 5:
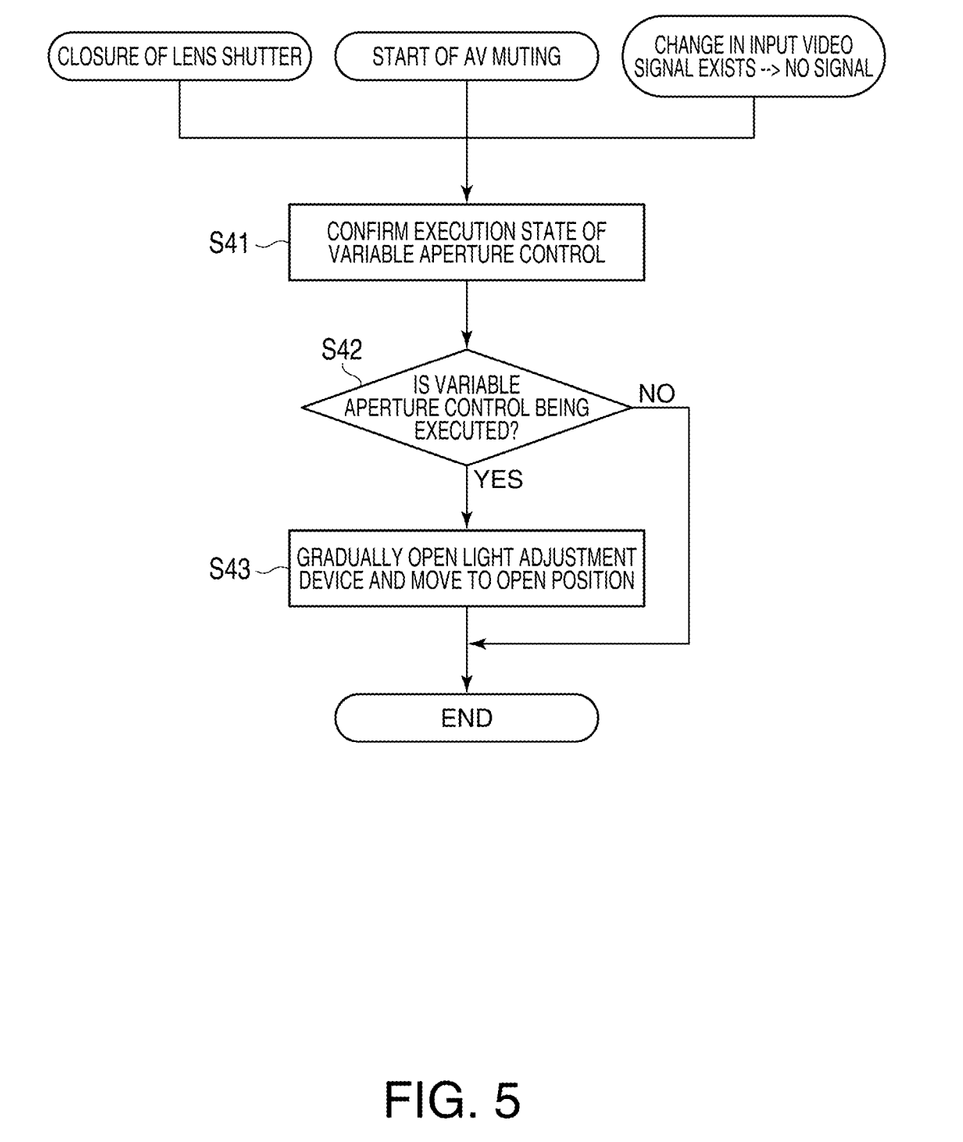
FIG. 5 is a flowchart showing operations of the projector.
Figure 6:
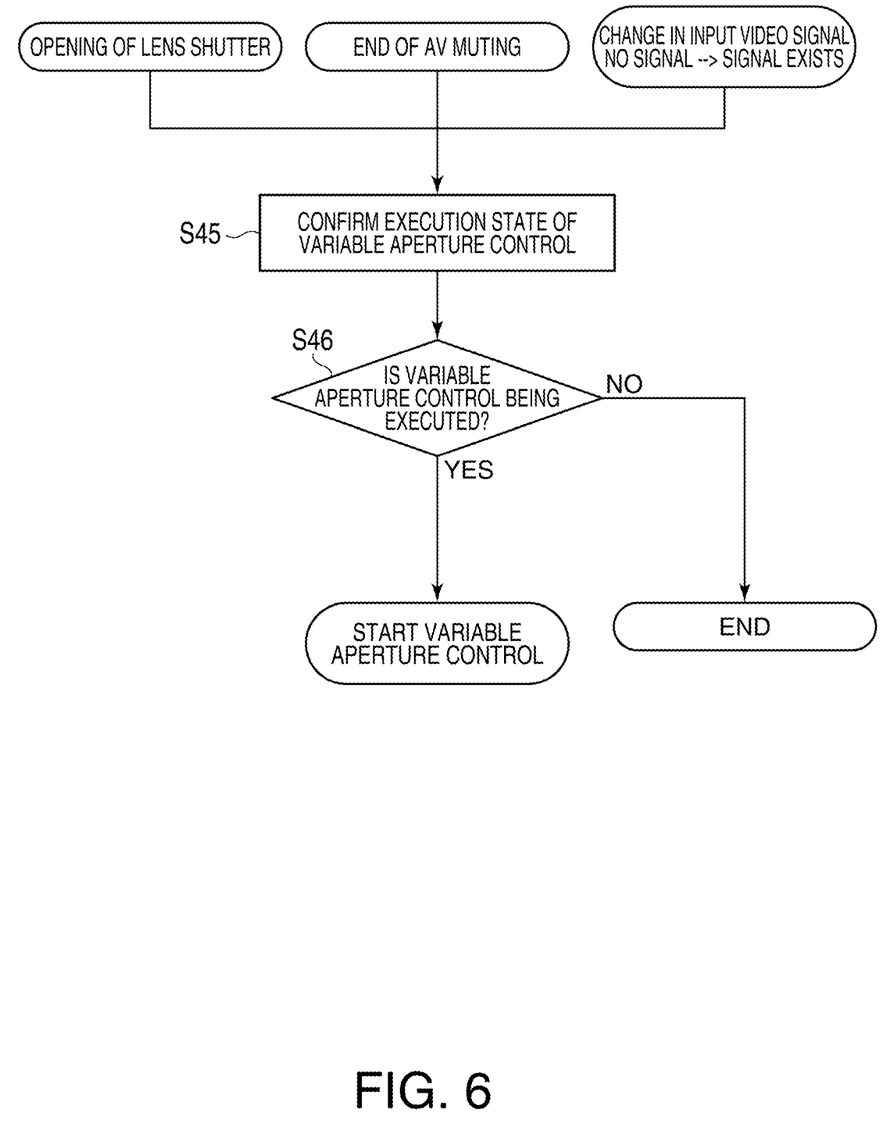
FIG. 6 is a flowchart showing operations of the projector.

FIGS. 3, 5 and 6 are flowcharts showing operations of the projector 11 and particularly show operations involved in the variable aperture control and the forced open control.

The light adjustment control unit 103C confirms the execution state of the variable aperture control (step S11) and determines whether a user's operation to designate the end of the variable aperture control is detected by the input processing unit 123 or not (step S12). If there is no user's operation to designate the end of the variable aperture control (step S12; No), the light adjustment control unit 103C determines whether the forced open control is set as valid or not, referring to setting data (not shown) stored in the storage unit 105 (step S13).

Now, setting items related to the forced open control will be described.

Figure 4:
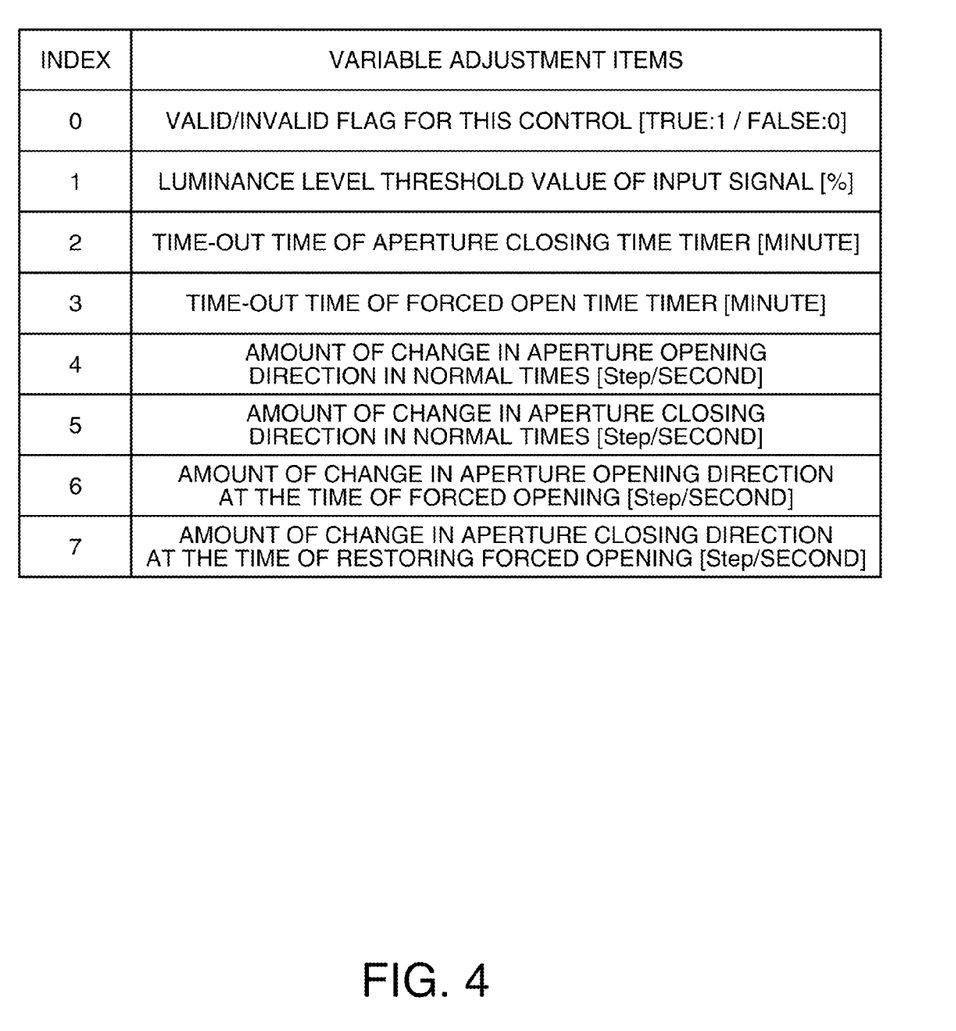
FIG. 4 is a chart showing a specific example of setting items according to forced open control of a light adjustment device.

FIG. 4 shows an example of setting items involved in the forced open control. Setting values for these setting items are stored as setting data in the storage unit 105.

Of the setting items illustrated in FIG. 4, a valid/invalid flag of the forced open control is an item to set whether or not to execute the forced open control itself in the projector 11. If the flag is set to 0 (FALSE), the light adjustment control unit 103C carries out no forced open control.

A threshold value of the luminance level of an input signal is a threshold value with which to determine whether there is an input of an image from the external device I/F 48 and the I/F 101. The input image detection unit 103A determines whether an image is inputted or not, based on whether the luminance level of the inputted signal is equal to or greater than the threshold value shown in FIG. 4 or is smaller than the threshold value. The luminance level is set as 100% for an input signal with a maximum luminance.

A time-out time of an aperture closing time timer is equivalent to a time limit from the start of the variable aperture control to the shift to the forced open control. That is, the light adjustment control unit 103C starts counting by the aperture closing time timer as the variable aperture control is started, and when the count value reaches a time-out time, the light adjustment control unit 103C shifts to the forced open control in order to prevent overheating of the light adjustment device 30. In other words, if the light adjustment device 30 maintains a predetermined light-adjusted state (for example, a state where the percentage of remaining light by the light adjustment device 30 falls to a predetermined value or below) for a predetermined period of time, the light adjustment control unit 103C carries out control to lower the light reduction level of the light adjustment device 30. It is preferable that the time-out time of the aperture closing time timer is set within a range that the light adjustment device 30 does not reach a temperature at which damage or the like to the light shielding plates 30a may be feared.

A time-out time of a forced open time timer is equivalent to a time limit for executing the forced open control. The light adjustment control unit 103C starts counting by the forced open time timer as the forced open control is started, and when the count value reaches the time-out time, the light adjustment control unit 103C ends the forced open control and restores the variable aperture control. It is preferable that the time-out time of the forced open time timer is set in consideration of the time required for cooling the light adjustment device 30 that has a higher temperature because of the variable aperture control. More specifically, as the variable aperture control starts after the lapse of the time-out time of the forced open time timer, the time-out time of the forced open time timer is preferably set within a range that the light adjustment device 30 does not reach a temperature at which damage or the like to the light shielding plates 30a may be feared, within the time-out time of the aperture closing time timer.

An amount of change in an aperture opening direction in normal times and an amount of change in an aperture closing direction in normal times are set values that define a moving speed at which the light shielding plates 30a are moved when the variable aperture control is executed. In this embodiment, since the moving parts 30b move the light shielding plates 30a by a stepping motor, the amount of change in the aperture opening direction in normal times is set based on the number of steps per second of the stepping motor. In the example of FIG. 4, the amount of change in the direction in which the light shielding plates 30a are made to advance to the optical path of the light L (aperture closing direction) and the amount of change in the direction in which the light shielding plates 30a are made to retreat from the optical path of the light L (aperture opening direction) can be set separately.

An amount of change in the aperture opening direction at the time of forced opening and an amount of change in the aperture closing direction at the time of restoring forced opening are set values that define a moving speed at which the light shielding plates 30a are moved when the forced open control is executed. These amounts of change are set based on the number of steps per second of the stepping motor, similarly to the amounts of change in normal times. In the example of FIG. 4, the amount of change in the direction in which the light shielding plates 30a are made to advance to the optical path of the light L (aperture closing direction) and the amount of change in the direction in which the light shielding plates 30a are made to retreat from the optical path of the light L (aperture opening direction) can be set separately. Since the stepping motor is used and the light shielding plates 30a are moved by each step, the percentage of remaining light can be changed gradually as described above in the forced open control.

Based on the setting data storing the set values illustrated in FIG. 4, the operations of FIG. 3 are executed.

If the forced open control is set as valid in step S13 of FIG. 3 (step S13; Yes), the light adjustment control unit 103C measures the luminance of a display signal outputted from the image processing unit 107 to the light modulation device drive unit 119 (step S14), then executes the variable aperture control, finds the percentage of remaining light at the light adjustment device 30 corresponding to the measured luminance, and drives the light adjustment device 30 (step S15).

Here, the light adjustment control unit 103C determines whether or not the measured luminance is equal to or lower than a prescribed value that is set in advance (step S16). If the luminance of the image to be displayed is low, the percentage of remaining light at the light adjustment device 30 is low and the light adjustment device 30 needs to shut off much light. On the other hand, if the luminance is high, the percentage of remaining light is high and there may be no fear of overheating even if the light adjustment by the light adjustment device 30 continues for a long time. In step S16, whether the luminance of the image to be displayed is such a degree that does not lead to overheating of the light adjustment device 30, or control to avoid overheating is necessary, is determined based on the prescribed value. This prescribed value is, for example, a value corresponding to the case where the percentage of remaining light at the light adjustment device 30 is 40% or lower.

If the luminance of the image to be displayed is equal to or lower than the prescribed value (step S16; Yes), the light adjustment control unit 103C determines whether the aperture closing time timer is stopped or not (step S17) in order to perform control to avoid overheating. If the aperture closing time timer is stopped (step S17; Yes), counting starts (step S18). Meanwhile, if the aperture closing time timer is now counting (step S17; No), the execution of the counting is continued. The aperture closing time timer is realized by a function of the CPU constituting the control unit 103.

After that, the light adjustment control unit 103C determines whether the count value of the aperture closing time timer reaches the time-out time defined by the setting data stored in the storage unit 105 or not (step S19). If the time-out time is not reached (step S19; No), the counting by the aperture closing time timer is continued. Then, the light adjustment control unit 103C waits for a time period equivalent to one count value and returns to step S11.

If the luminance of the image to be displayed is higher than the prescribed value (step S16; No), control to avoid overheating is not necessary. Therefore, the light adjustment control unit 103C stops the counting by the aperture closing time timer, then resets the count value (step S21) and returns to step S11.

Meanwhile, if the count value on the aperture closing time timer reaches the time-out time (step S19; Yes), the light adjustment control unit 103C starts the forced open control and opens the light adjustment device 30 gradually to move the light shielding plates 30a to the position where the percentage of remaining light is 100% (step S22). In this operation, the light adjustment control unit 103C may gradually move the stepping motor of the moving parts 30b every several steps or may be move the stepping motor slowly and continuously.

The light adjustment control unit 103C stops the aperture closing time timer (step S23) and starts counting by the forced open time timer (step S24). Then, the light adjustment control unit 103C increments the count on the forced open time timer and waits for a time period equivalent to one count value (step S25), and determines whether the count value on the forced open time timer reaches the time-out time defined by the setting data stored in the storage unit 105 or not (step S26).

Here, if the count value on the forced open time timer does not reach the time-out time (step S26; No), the light adjustment control unit 103C returns to step S25 and continues the counting. If the count value on the forced open time timer reaches the time-out time (step S26; Yes), the counting by the forced open time timer is stopped and the count value is reset (step S27) and the light adjustment device 30 is made to restore the state before the forced open control (step S28). That is, the light adjustment control unit 103C moves the light shielding plates 30a of the light adjustment device 30 to a position where the percentage of remaining light corresponding to the luminance of the image to be displayed is achieved. After carrying out this restoration control, the light adjustment control unit 103C returns to step S11.

If a user's operation to designate the end of the variable aperture control is detected by the input processing unit 123 (step S12; Yes), the light adjustment control unit 103C moves the light adjustment device 30 to the open position, that is, the position where the percentage of remaining light is 100% (step S29), stops the counting by the aperture closing time timer and resets the count value (step S30), and ends this processing. Moreover, if an invalid flag for the forced open control is set (step S13; No), the light adjustment control unit 103C shifts to step S30, stops the counting by the aperture closing time timer and resets the count value, and ends this processing.

In this way, by carrying out the variable aperture control to control the light adjustment device 30 in accordance with the luminance of the image to be displayed and thus adjusting the percentage of remaining light, the projector 11 can projects a high-definition image. In the case where conditions in which overheating of the light adjustment device 30 may be feared are established, the forced open control is carried out to move the light shielding plates 30a to the position where the percentage of remaining light is 100%. Specifically, if the duration of a state with a predetermined percentage of remaining light or below (a predetermined light reduction level or above) reaches a time that is set as the time-out time of the aperture closing time timer, the forced open control is carried out. Thus, overheating of the light adjustment device 30 can be avoided.

By the way, in the case where the AV muting is carried out, in the case where no image is projected, or in the case where the lens shutter 42 is closed, light emitted from the lamp 2 is shut off by the liquid crystal light valve 39 or the lens shutter 42. Therefore, the definition of the projected image is not affected even if the variable aperture control is not carried out by the light adjustment device 30. Thus, in the projector 11, in the case where the AV muting is carried out, in the case where there is no input of an image from the external device I/F 48 or the I/F 101, and in the case where the lens shutter 42 is closed, the variable aperture control is stopped and the light adjustment device 30 is shifted to a completely open state where the percentage of remaining light is 100%. Thus, overheating of the light adjustment device 30 can be prevented securely and arithmetic processing involved in unnecessary variable aperture control can be omitted, thus realizing more efficient processing.

FIG. 5 particularly shows operations in the case where the lens shutter 42 is closed, in the case where the start of the AV muting is designated, and in the case where the input of an image via the external device I/F 48 or the I/F 101 is stopped.

When the shutter detection unit 43 detects the closure of the lens shutter 42, an operation to designate the AV muting is carried out. When the AV muting is started by the liquid crystal light valve 39, and when the input image detection unit 103A detects the stop of the input of an image via the external device I/F 48 or the I/F 101 (for example, a change to a no-signal state), an interruption to the light adjustment control unit 103C is carried out and the operation of FIG. 5 is started.

In the operation of FIG. 5, the light adjustment control unit 103C confirms the execution state of the variable aperture control (step S41) and determines whether the variable aperture control is being executed or not (step S42). Here, if the variable aperture control is being executed (step S42; Yes), the light adjustment control unit 103C gradually opens the light adjustment device 30 to move the light shielding plates 30a to the position where the percentage of remaining light is 100% (step S43), as in step S22 (FIG. 3), and ends this processing. In this operation, the light adjustment control unit 103C may move the stepping motor of the moving parts 30b gradually every several steps, or may move the stepping motor slowly and continuously. If the variable aperture control is not being executed (step S42; No), this processing ends there.

After that, if the lens shutter 42 is opened, if the end of the AV muting is designated, and if the input of an image via the external device I/F 48 or the I/F 101 is resumed, the light adjustment control unit 103C executes the operation shown in FIG. 6. That is, when the shutter detection unit 43 detects the opening of the lens shutter 42 after the execution of the operation of FIG. 5, an operation to designate the end of the AV muting is carried out. When normal display is started by the liquid crystal light valve 39, and when the input image detection unit 103A detects that the input of an image via the external device I/F 48 or the I/F 101 is resumed, an interruption to the light adjustment control unit 103C is carried out and the operation of FIG. 6 is started. In the operation of FIG. 6, the light adjustment control unit 103C confirms the execution state of the variable aperture control (step S45) and determines whether the variable aperture control is being executed in step S42 of FIG. 5 or not (step S46). If the variable aperture control is being executed and this variable aperture control is paused in step S43 of FIG. 5 (step S46; Yes), the light adjustment control unit 103C resumes the variable aperture control shown in FIG. 3. On the other hand, if the variable aperture control is not being executed (step S46; No), this processing ends.

Figure 7:
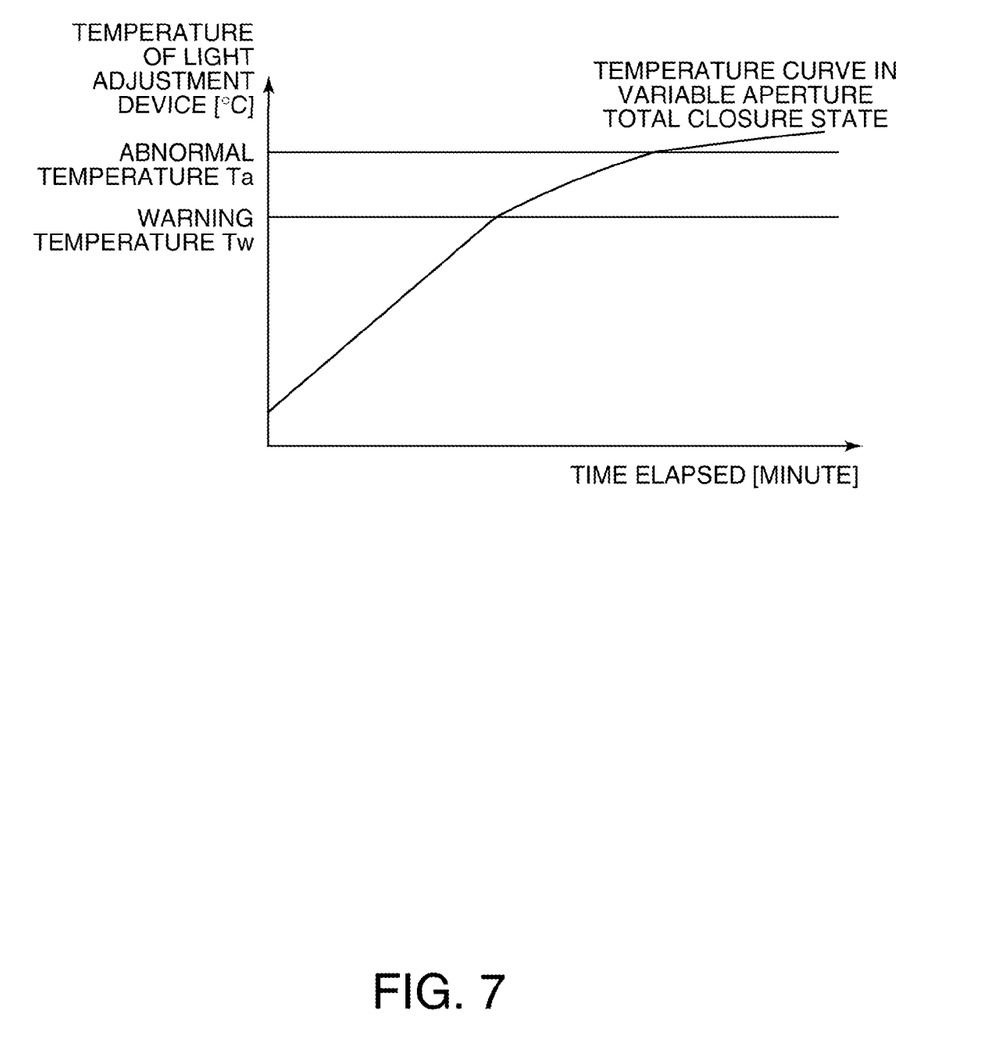
FIG. 7 is a chart showing an example of temperature change in the light adjustment device in the case where force open control is not carried out.
Figure 8:
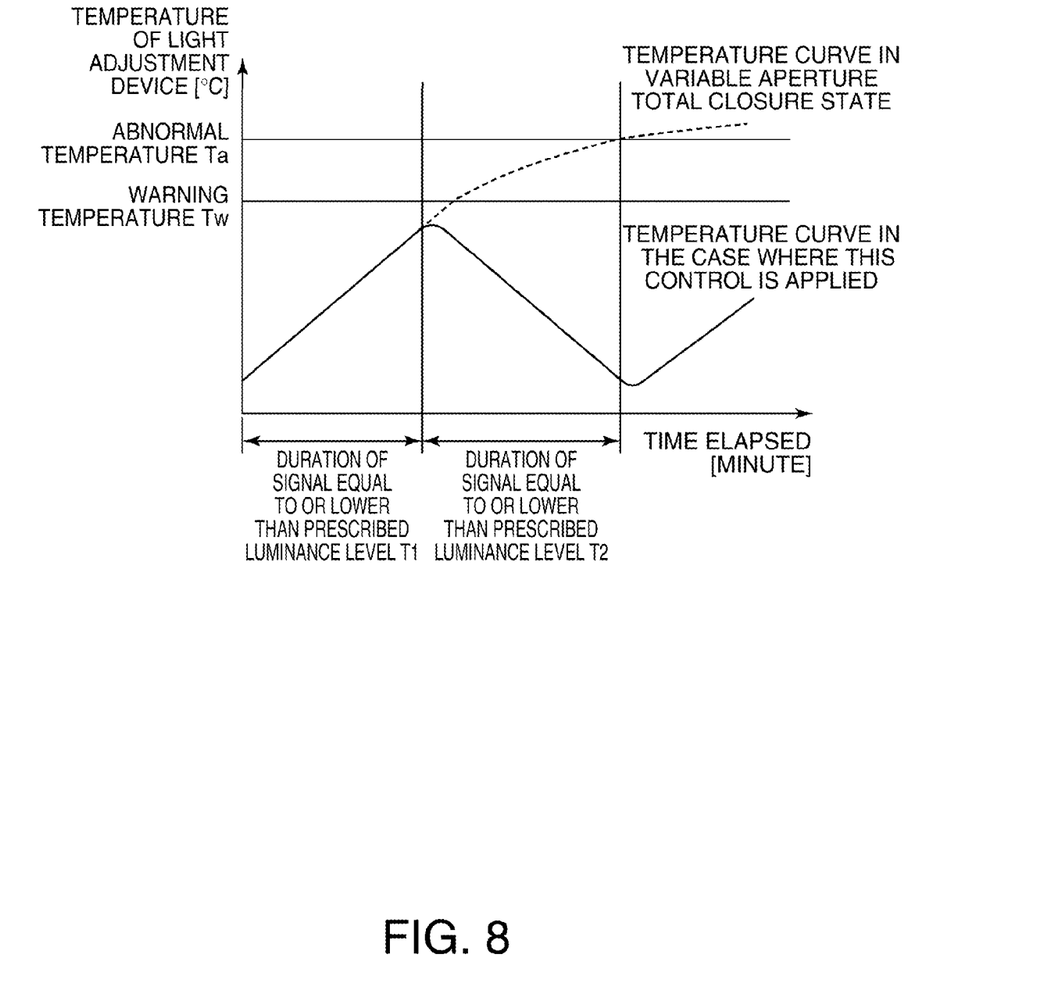
FIG. 8 is a chart showing an example of temperature change in the light adjustment device in the case where forced open control is executed.

FIG. 7 is a chart showing an example of temperature change in the light adjustment device in the case where the forced open control is not carried out. FIG. 8 is a chart showing an example of temperature change in the light adjustment device in the case where the forced open control is carried out.

In the temperature change shown in FIG. 7, as a comparative example to FIG. 8, the overheating state of the light adjustment device 30 is ignored. This chart does not mean that a temperature change as shown in FIG. 7 actually occurs in a device to which the invention is not applied or in a device where the forced open control is set as invalid.

In the case where the forced open control is not carried out, if variable aperture control in which the percentage of remaining light at the light adjustment device 30 becomes a predetermined value or below is continued, the light shielding plates 30*a* receives the energy of the light L from the lamp 2 and therefore the temperature of the light adjustment device 30 rises gradually. Particularly in a totally closed state where the light adjustment device 30 shuts off the light L to the maximum, the temperature of the light adjustment device 30 rises with the lapse of time and reaches a warning temperature Tw at which overheating of the light adjustment device 30 is feared, as shown in FIG. 7. If the lighting of the lamp 2 is further continued from then and the variable aperture control is continued, the temperature may ultimately reach an abnormal temperature Ta at which damage to the light adjustment device 30 is feared.

Meanwhile, if the forced open control is carried out according to the state of the variable aperture control in the light adjustment device 30, the temperature of the light adjustment device 30 can be maintained at or below the warning temperature Tw, as shown in FIG. 8. That is, before the warning temperature Tw is reached, the count value on the aperture closing time timer reaches a time-out time t1. The forced open control is carried out and the light adjustment device 30 enters the state where the percentage of remaining light is 100% and the temperature falls, until the time-out time of the forced open time timer is reached. Thus, overheating of the light adjustment device 30 can be avoided securely.

As described above, the projector 11 according to the embodiment to which the invention is applied is the projector 11 which modulates light emitted from a light source and projects the light. The projector 11 includes: the display control unit 103B which acquires an image via the external device I/F 48 or the I/F 101; the light modulation device 32 which modulates the light emitted from the light sources, based on the image acquired by the display control unit 103B; the light adjustment device 30 which reduces the amount of the light emitted from the light source; and the light adjustment control unit 103C which performs light adjustment control by the light adjustment device 30 based on the image acquired by the display control unit 103B. The light adjustment control unit 103C stops execution of the light adjustment control when at least one of the operating state of the projector 11 and the state of the image acquired by the display control unit 103B meets a predetermined condition. Thus, since the execution of the light adjustment control is stopped when the predetermined condition is met, for example, unnecessary light adjustment control can be omitted when the light adjustment control need not be carried out. Overheating of the light adjustment device 30 can be prevented and processing efficiency can be improved.

Here, the light adjustment control unit 103C stops the light adjustment control when the input of the input image from the external device acquired by the display control unit 103B is stopped, when the light is shut off by the lens shutter 42, or when the AV muting is executed to reduce the light amount to the predetermined amount or less by the light modulation unit 32, as the predetermined condition. Thus, unnecessary light adjustment control can be stopped when the light adjustment control need not be carried out.

Also, the light adjustment control unit 103C carries out the forced open control when stopping the execution of the light adjustment control and controls the light adjustment device 30 so as not to reduce the amount of the light emitted from the lamp 2. Therefore, overheating of the light adjustment device 30 can be prevented more securely.

Moreover, if the light adjustment device 30 maintains a light-adjusted state where the percentage of remaining light is 40% or lower, the light adjustment control unit 103C carries out the forced open control to lower the light reduction level by the light adjustment device 30 and thus can prevent overheating of the light adjustment device 30.

The above embodiment is not intended to limit the invention and the invention can be applied in different forms from the embodiment. For example, in the embodiment, the light adjustment device 30 has the light shielding plates 30*a* and the moving parts 30*b* and is configured to cause the light shielding plates 30*a* to advance and retreat by the stepping motor of the moving parts 30*b*. However, the invention is not limited to this configuration. For example, a rotary flap-shaped light shielding plate may be provided, and this light shielding plate may rotate and thus protrude to the optical path of the light L to shut off the light. The percentage of remaining light may be controlled by the rotation angle of the light shielding plate. Also, the projector 11 may be configured to project an image from the front side of a screen SC or may be configured to project an image from the back side of a transmission-type screen SC.

Moreover, the control program 105A, the setting data and the like stored in the storage unit 105 in the embodiment can be configured in a portable recording medium. Another device connected to the projector 11 via a communication network may store the control program 105A and the setting data in a way that allows download from the device.

Also, each functional unit in the projection system 10 shown in FIG. 2 represents a functional configuration and specific embodiments thereof are not particularly limited. That is, an individual hardware unit that corresponds to each function unit need not necessarily be installed, and one processor may execute a program to realize the functions of plural functional units. Also, a part of the functions realized by software in the embodiment may be realized by hardware. Alternatively, a part of the functions realized by hardware may be realized by software. In addition, the specific configurations of the details of the projection system 10 can be arbitrarily changed without departing from the scope of the invention.

What is claimed is:

1. A projector which modulates light emitted from a light source and projects the light, the projector comprising:
   an image acquiring unit for acquiring an image from an image source;
   a modulating unit for modulating the light emitted from the light sources, based on the image acquired by the image acquiring unit;
   a light adjustment mechanism for adjusting an amount of light incident on the modulating unit from the light source; and
   a light adjustment control unit for performing light adjustment control by the light adjustment mechanism, based on the image acquired by the image acquiring unit,
   wherein the light adjustment control unit performs control to increase the amount of light incident on the modulating unit when the light adjustment mechanism maintains a predetermined light-adjusted state for a predetermined period of time.

2. The projector according to claim 1, wherein the light adjustment control unit stops the execution of the light adjustment control and controls the light adjustment mechanism so as not to reduce the amount of light emitted from the light source, when at least one of the operating state of the projector and the state of the image acquired by the image acquiring unit meets a predetermined condition.

3. The projector according to claim 1, wherein the light adjustment control unit performs control to lower a light reduction level by the light adjustment mechanism when the light adjustment mechanism maintains a predetermined light-adjusted state for a predetermined time period.

4. The projector according to claim 1, wherein
the image acquiring unit acquires an image inputted from an external device, and
the light adjustment control unit stops the execution of the light adjustment control when input of an image from the external device is stopped.

5. The projector according to claim 1, further comprising a shutter mechanism for shutting off the light emitted from the light source,
wherein the light adjustment control unit stops the execution of the light adjustment control when the light is shut off by the shutter mechanism.

6. The projector according to claim 1, wherein the light adjustment mechanism stops the execution of the light adjustment control when the amount of light is reduced to a predetermined amount of light or less by the modulating unit.

7. The projector according to claim 1, wherein the light adjustment control unit changes a light reduction state by the light adjustment mechanism at least in plural stages in the light adjustment control.

8. A control method for a projector which includes a light source, a modulating unit that modulates light emitted from the light source, and a light adjustment mechanism that adjusts an amount of light incident on the modulating unit from the light source, and which adjusts the light emitted from the light source by the light adjustment mechanism and projects the light, the method comprising:
acquiring an image from an image source;
modulating the light emitted from the light source, based on the acquired image;
performing light adjustment control by the light adjustment mechanism based on the acquired image; and
performing control to increase the amount of light incident on the modulating unit when the light adjustment mechanism maintains a predetermined light-adjusted state for a predetermined period of time.

9. The method according to claim 8, wherein the execution of the light adjustment control is stopped and the light adjustment mechanism is controlled so as not to reduce the amount of light emitted from the light source, when at least one of the operating state of the projector and the state of the acquired image meets a predetermined condition.

10. The method according to claim 8, wherein the light reduction level is controlled to be lowered by the light adjustment mechanism when the light adjustment mechanism maintains a predetermined light-adjusted state for a predetermined time period.

11. The method according to claim 8, wherein
the acquired image is inputted from an external device, and
the execution of the light adjustment control is stopped when input of an image from the external device is stopped.

12. The method according to claim 8, the projector further including a shutter mechanism for shutting off the light emitted from the light source,
wherein the execution of the light adjustment control is stopped when the light is shut off by the shutter mechanism.

13. The method according to claim 8, wherein the execution of the light adjustment control is sopped when the amount of light is reduced to a predetermined amount of light or less by the modulating unit.

14. The method according to claim 8, further comprising changing a light reduction state by the light adjustment mechanism at least in plural stages in the light adjustment control.

\* \* \* \* \*